United States Patent
Vidondo

(10) Patent No.: US 9,173,518 B2
(45) Date of Patent: Nov. 3, 2015

(54) BOILER AND DISPENSER SYSTEM FOR A HOT BEVERAGE VENDING MACHINE

(75) Inventor: Félix Guindulain Vidondo, Peralta (ES)

(73) Assignee: JOFEMAR, S.A., Peralta (Navarra) (ES)

(*) Notice: Subject to any disclaimer, the term of this patent is extended or adjusted under 35 U.S.C. 154(b) by 792 days.

(21) Appl. No.: 13/509,212

(22) PCT Filed: Nov. 18, 2010

(86) PCT No.: PCT/ES2010/070745
§ 371 (c)(1),
(2), (4) Date: Aug. 23, 2012

(87) PCT Pub. No.: WO2011/061377
PCT Pub. Date: May 26, 2011

(65) Prior Publication Data
US 2012/0325094 A1    Dec. 27, 2012

(30) Foreign Application Priority Data
Nov. 18, 2009    (ES) .................................. 200931021

(51) Int. Cl.
*A47J 31/00* (2006.01)
*A47J 31/46* (2006.01)
*A47J 31/54* (2006.01)
*A47J 31/36* (2006.01)

(52) U.S. Cl.
CPC ...... *A47J 31/46* (2013.01); *A47J 31/54* (2013.01); *A47J 31/36* (2013.01)

(58) Field of Classification Search
CPC .......... A47J 31/46; A47J 31/36; F24H 9/2021
USPC ........................................ 99/300, 302 R, 290
See application file for complete search history.

(56) References Cited

U.S. PATENT DOCUMENTS

| 4,505,191 A | * | 3/1985 | Longo ............................. 99/300 |
| 4,565,121 A | * | 1/1986 | Ohya et al. ..................... 99/281 |
| 5,337,652 A | * | 8/1994 | Fischer et al. ................. 99/282 |
| 6,286,416 B1 | * | 9/2001 | Van Der Meer ............... 99/293 |
| 2008/0202612 A1 | * | 8/2008 | Weijers ......................... 137/625 |

FOREIGN PATENT DOCUMENTS

| EP | 2077086 A1 | 7/2009 |
| WO | WO-02100227 A1 | 12/2002 |
| WO | WO-2005004684 A1 | 1/2005 |

OTHER PUBLICATIONS

International Search Report issued in PCT/ES2010/070745 on Apr. 21, 2011.

* cited by examiner

*Primary Examiner* — Reginald L Alexander
(74) *Attorney, Agent, or Firm* — Blank Rome LLP

(57) ABSTRACT

A pressurized boiler comprises a first three-way valve, a dispenser, and a control card. The first valve comprises a seat integrated in the boiler and a pilot screwed into the seat. The dispenser receives hot water from the boiler through a first pipe and comprises a plurality of consecutively connected serving elements, each of which has three branches, which include closing means controlled by the card and which enable the direction of hot water towards a selected hot beverage serving. The first valve enables the direction of hot water from the boiler towards the dispenser and air towards the dispenser, draining the water downstream from the boiler so that it does not remain in the system and cool down between two consecutive servings. The boiler and the dispenser can be remotely disposed relative to each other.

6 Claims, 3 Drawing Sheets

BOILER AND DISPENSER SYSTEM FOR A HOT BEVERAGE VENDING MACHINE

This application is the U.S. national phase of International Patent Application No. PCT/ES2010/070745, filed Nov. 18, 2010, which claims priority to Spanish Patent Application No. P200931021, filed Nov. 18, 2009.

OBJECT OF THE INVENTION

The present invention can be included in the technical field of hot beverage vending machines.

In particular, the object of the invention relates to a boiler-dispenser system for a hot beverage vending machine.

BACKGROUND OF THE INVENTION

Presently known hot beverage vending machines comprise a boiler in which water is heated to predetermined suitable conditions, and further comprise means for conducting said hot water towards a dispenser, which in turn directs the water towards a beverage serving depending upon the beverage selected. Depending on whether or not it is necessary to pressurize the water, a distinction is made between two types of hot beverage machines: powdered beverage machines and soluble beverage machines. Soluble beverage machines serve only hot beverages that do not require pressurized hot water, i.e., they serve beverages made from soluble products such as cocoa, instant coffee, and the like, as well as infusion hot beverages. Said soluble beverage machines are characterized in that the water used in the serving of the product can be used at atmospheric pressure. In contrast, powdered beverage machines alternatively or additionally serve products that require water at a pressure of at least 9 bars in order to prepare them, such as non-soluble ground coffee in its various forms.

In the case of soluble beverage machines, the boiler must be a large-volume stainless steel open boiler. In the case of powdered beverage machines, use is made of a more economical closed, pressurized boiler.

One of the disadvantages associated with hot beverage machines is that the first soluble hot beverage or beverages served after a period of no servings are served at an appreciably lower than usual temperature. This is due to the fact that the residual water in the pipes between the boiler and the dispensers as well the pipes themselves and other elements such as valve seats, which generally consist of bulky brass bodies, cool down after a certain period of time so that the first serving or servings after this period yield part of their heat to heat all of the aforementioned elements to the design conditions.

Solutions to this problem have been proposed, such as, for example, establishing either a periodic or a temperature-controlled circulation of hot water. This system is not sufficiently effective; however, as to a large extent the degree of cooling depends on the conditions outside the machine, which are extremely variable depending on the location of said machine, hence an excessively complex control mechanism would be required in order to determine the ideal circulation conditions. As a consequence of not providing said control mechanism, the aforementioned recirculation mitigates the cooling effects, but fails to provide a complete and effective solution to the problem.

An alternative, more effective solution consists of draining the pipes with each serving by inducing an air intake in the last part of each serving. Because no residual water remains in the pipes between two consecutive servings, appreciable improvements have been achieved with this system. A three-way electrovalve is disposed in the top part of the boiler in order to implement this solution. One of the ways is the water inlet from the boiler, another is the outside air inlet, and the third is the water outlet towards the dispenser.

Nevertheless this solution is not ideal: in each serving a volume of water is retained in the electrovalve seats, between the boiler and the pipes, and when this water cools down the disadvantage persists.

The technical problem consists of providing a hot beverage vending machine wherein after each serving no water remains outside the boiler and wherein in addition the amount of heat yielded by the elements outside the boiler after each serving and the amount of additional heat needed to maintain the hot beverage serving at the design temperature are minimized.

DESCRIPTION OF THE INVENTION

The present invention solves the posed problem by means of a boiler-dispenser system for a coffee vending machine in which the boiler is a pressurized closed boiler that includes a first three-way valve connected by a first pipe to a dispenser designed for serving soluble beverages.

The first three-way valve is designed to withstand conditions of pressure between 9 and 16 bars and comprises two parts: a pilot, preferably made of stainless steel, and a seat. The first valve has the advantageous characteristic of the seat being integrated in the boiler, forming part of said boiler. Hence a first way of said first valve is connected to an water inlet from the boiler, a second way is connected to an outside air inlet, and a third way is connected to a water or air outlet towards the soluble beverage dispenser. In the present document and in the technical field in which the present invention is included, "soluble beverages" is understood to mean soluble hot beverages such as cocoa, instant coffee, etc., as well as infusion hot beverages. The first valve makes it possible to select between: a) outlet of water from the boiler towards the soluble beverage dispenser; b) inlet of air towards the soluble beverage dispenser so that the pipe between the first valve and the soluble beverage dispenser drains by gravity.

The system of the invention is intended for use in vending machines that only dispense soluble hot beverages as well as for serving soluble hot beverages in machines that also include powdered beverages. For the latter case of powdered beverage machines, the invention includes an additional second valve for serving powdered beverages, which is not part of the invention.

Because the valve seat is integrated in the boiler, no residual water remains between the boiler and the dispenser after the first pipe is drained after each serving, thus solving said residual water cooling problem once and for all. This in addition results in a savings in the acquisition of the first valve, as it is only necessary to acquire the pilot for the first valve rather than the pilot and seat assembly.

The invention further comprises a soluble beverage dispenser, which is supplied with the water conducted from the first valve through the first pipe. The water supplied from the first valve through the first pipe reaches the dispenser, which comprises a plurality of consecutively arranged three-branched serving elements. A first branch is designed to receive the water supplied by the upstream-disposed serving element or, in the case of the serving element disposed in the first position, the water supplied from the boiler through the first pipe, whereas a second branch is designed to conduct the water towards a selected hot beverage serving, and a third branch is designed to conduct the water towards the first branch of the next serving element. The third branch of the last serving element is closed in order to plug said last serving element and prevent water from leaking. All of the first and third branches of the serving elements form part of a second pipe. Each serving element comprises closing means, wherein the selective opening and closing of said means induces the circulation of water through the second pipe towards the selected hot beverage serving.

The invention comprises a control card for controlling various operational aspects of the invention such as the inlet of water into the boiler, the heating and pressurization of the water in the boiler, as well as the opening and closing of the first valve and the operation of the closing means.

Preferably, the serving elements are manufactured by extrusion of a polymer material resistant to the pressure and temperature operating conditions of the machine. Preference is given to the third branch of each serving element being joined to the first branch of the next serving element by means of a metal bushing and watertight seals resistant to the aforementioned pressure and temperature conditions. Preference is given to obtaining the last serving element from a mold suitable for producing a last serving element with the third branch closed.

According to a preferred embodiment, the boiler is made of stamped brass. According to another preferred embodiment, the boiler is composed of two equal bodies joined by one of their ends. One of the bodies has a bore hole in the seat of the first valve, whereas the other body has a water inlet bore hole.

According to a preferred embodiment of the invention, the first valve is controlled by the control card, said first valve comprising a pilot that possesses an element screwed to the seat, in the inside of which is disposed a moveable cylinder-shaped metal core displaceable between a position that allows the passage of air towards the first pipe, plugging the water outlet to the first pipe, and another position that allows the passage of water while blocking the passage of air.

According to a preferred embodiment of the invention, the means for closing the serving elements comprise a metal rod sealingly disposed inside of said serving elements and designed to be electromagnetically excited by a metal core stationarily mounted in proximity thereto. The displacement of the rod makes it possible to select the passage of water towards the second branch of the serving element associated with the selected hot beverage without interfering with the circulation of water throughout the second pipe.

Owing to the fact that the inside of the dispenser is not subjected to pressure, the serving elements do not need to be metal, with preference being given to the use of serving elements made of food grade polymer materials such as polysulfone.

The dispenser is preferably and advantageously not necessarily arranged in a position adjacent to the boiler, instead the first pipe can be of sufficient length to allow the arrangement of the dispenser inside the hot beverage machine in a location remote from the boiler, which is more convenient in terms of space or for other reasons. Hence the distance from the dispenser to the boiler, i.e., the length of the pipe, is no longer a critical parameter with the advantage of providing design flexibility, as it is not necessary to arrange the dispenser adjacently to the boiler.

Owing to the present invention, the temperature of the soluble hot beverages is not dependent on the temperature of the last serving, nor on the time elapsed since said last serving.

Additionally, the invention allows greater design and construction flexibility, avoiding the design limitations associated with the need of arranging the dispenser adjacently to the boiler, as mentioned previously.

The drainage of water after each serving contributes to the sturdiness of the unit, as by not having water in any of the pipes between the boiler and dispenser, lime deposits do not form in the first valve and the serving elements, thus prolonging their useful life.

The fact of only having to acquire the pilots of the first valve because the seats are integrally formed with the boiler appreciably lowers the cost of the hot beverage machine. The use of polymer serving elements, which cost less than the metal electrovalves, constitutes another source of savings.

DESCRIPTION OF THE DRAWINGS

To supplement the following description of a preferred illustrative embodiment of the invention and for a better understanding of the characteristics of the invention, a series of drawings, which are an integral part of said description, are provided solely as an example and are in no way limiting. Shown are.

PREFERRED EMBODIMENT OF THE INVENTION

Figure 1:
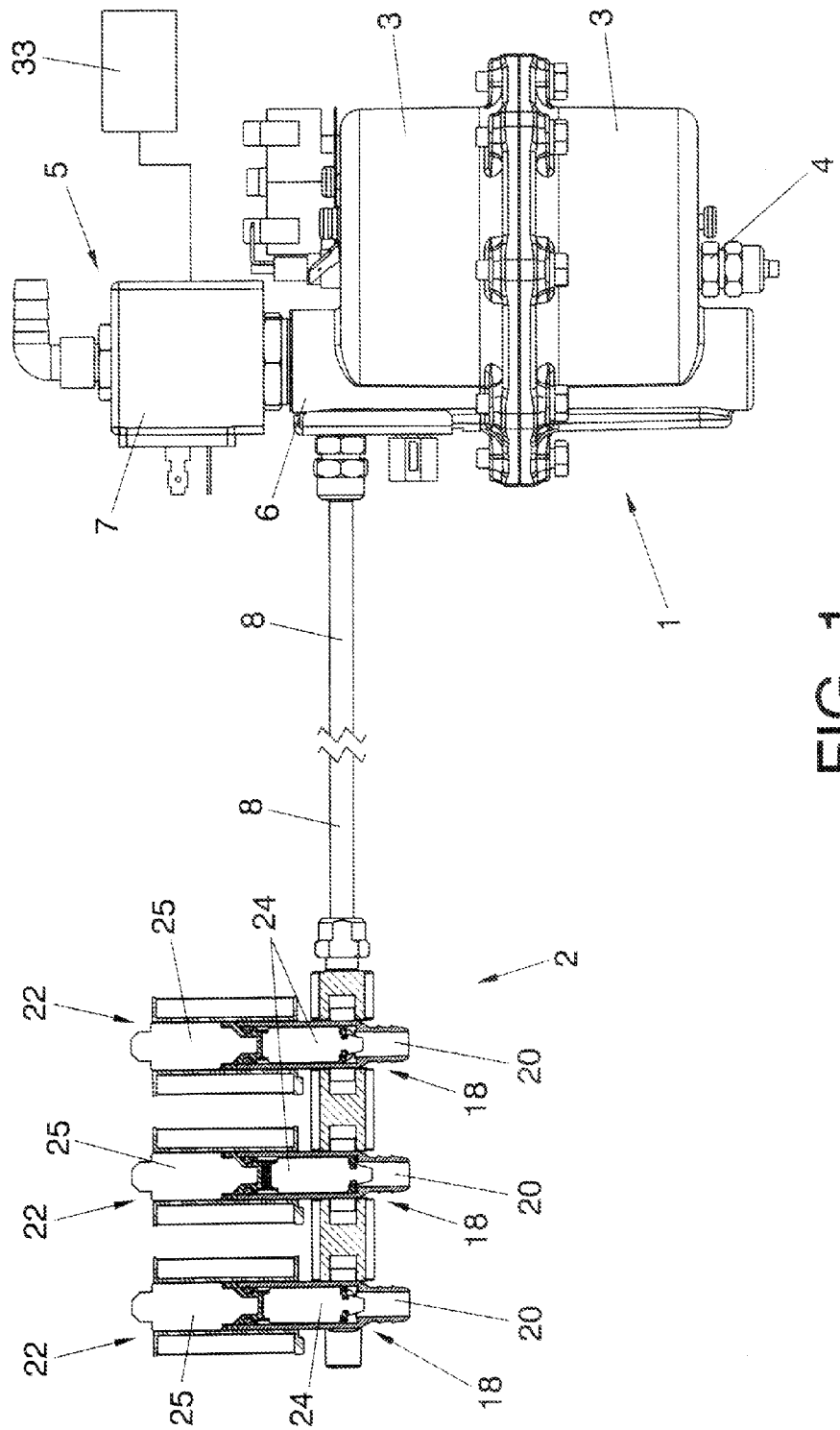
FIG. 1.—A cross-sectional view of the boiler-dispenser assembly.

As can be discerned in FIG. 1, the invention relates to a boiler (1) and dispenser (2) system for use in a soluble and/or infusion hot beverage vending machine.

Figure 2:
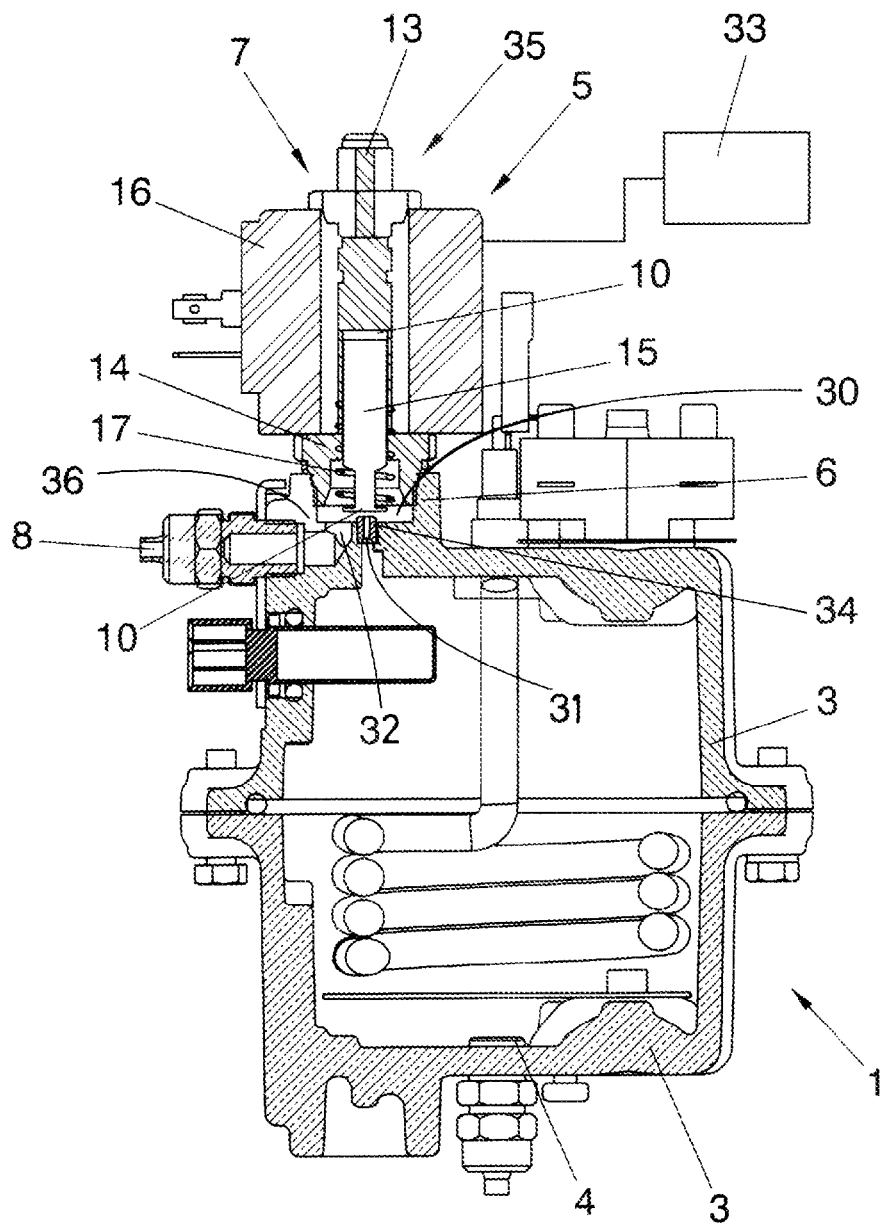
FIG. 2.—A cross-sectional view of the boiler.

In FIG. 2 it can be discerned that the boiler (1) and dispenser (2) system of the invention comprises a closed pressurized boiler (1) composed of two sealingly joined equal bodies (3) manufactured by brass stamping, and further comprises a dispenser (2) designed to direct hot water from the boiler (1) towards a previously selected soluble or infusion hot beverage serving. The boiler (1) further comprises an intake (4) for water supplied from a vessel (not shown) filled with tap water.

According to FIG. 2, the system includes a first three-way valve (5) comprising a seat (6) and a pilot (7). The seat (6) is advantageously integrated in one of the bodies (3) of the boiler (1). The bodies (3) are essentially equal and interchangeable for the sake of ease in manufacturing and less expense for molds. Hence one of the bodies (3) mechanically bears the water intake (4) for the boiler (1), whereas the other body (3) mechanically bears, on the seat (6), the water and air outlet towards the dispenser and the connection to the pilot (7).

The pilot (7) can thus be easily fastened onto the seat (6) by means of threads or other mechanically or functionally equivalent connecting means. The first valve (5) is connected to the dispenser (2) by means of a first pipe (8) made of teflon or a functionally equivalent material.

The first valve (5) is a three-way electrovalve. The first way (34) is connected to the water intake (4) for the boiler (1), whereas the second way (35) is connected to an outside air inlet (13), and the third way (36) is connected to a water outlet towards the dispenser (2).

A control card (33) controls the operation of the boiler (1) and dispenser (2) system and the hot beverage vending machine in general. In particular the control card (33) controls, by means of the first valve (5), and with the help of a deposit (30) located in the first valve (5) and connected by a first connection (31) to the water inlet of the boiler (1), and by a second connection (32) to the third way (36), the selection of the passage of water from the boiler (1) towards the dispenser (2) through the first pipe (8) or the passage of air towards the dispenser (2) through the first pipe (8).

Owing to the passage of air through the first pipe (8) towards the dispenser (2), after each serving the water is drained from the first pipe (8) downstream from the boiler (1) by gravity. Hence no residual water is retained between two consecutive servings in any of the elements disposed beyond the boiler, namely the pilot (5)[sic], the first pipe (8), and the second pipe, and thus there is no cooling of said residual water when said consecutive servings are separated by a considerable period of time.

The pilot (7) of the first valve (5) comprises an element (14) screwed to the seat (6), inside of which is disposed a cylindrical moveable metal core (15), which is vertically displaceable inside said element (14) by means of electromagnetic excitation induced by a coil (16). When the coil (16) induces an electromagnetic field, the inside of the element (14), except for the moveable core (15), fills with water, for which the moveable core (15) has a channel (not shown) along a generating line for reducing viscous friction, thus facilitating the vertical displacement of said moveable core (15). When no electromagnetic excitation is induced, a first spring (17) holds the moveable core (15) in a bottom position blocking the passage of water from the boiler (1) towards the first pipe (8). In this case the outer air inlet (13) is open, admitting the passage of air from the outside towards the first pipe (8). When electromagnetic excitation is induced, the field created by the coil (16) drives the moveable core (15) upwards, overcoming the resistance of the first spring (17), until said moveable core (15) blocks the passage of air from the outside towards the first pipe (8). The passage of water from the boiler (1) towards the first pipe (8) thus remains open.

Figure 3:
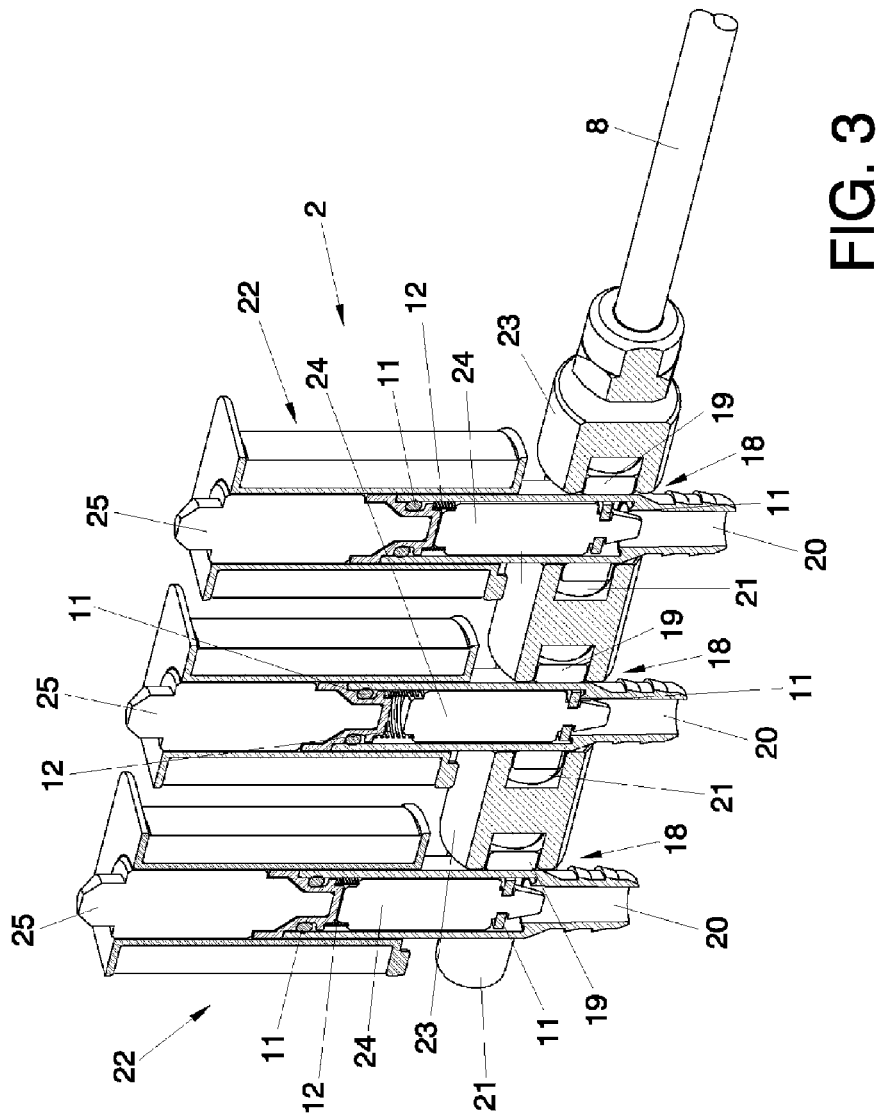
FIG. 3.—A cross-sectional view of the dispenser.

As can be discerned in FIG. 3, the invention includes a dispenser (2) designed to conduct the hot water to a selected soluble or infusion hot beverage serving. The hot water reaches the dispenser (2) through the first pipe (8). The dispenser (2) comprises a plurality of serving elements (18) connected in consecutive series to one another. Each one of the serving elements (18) comprises three branches (19, 20, 21). A first inlet branch (19) is designed to receive the water from the upstream-disposed serving element (18) (from the first pipe (8) in the case of the serving element (18) disposed in the first position), whereas a second branch (20) is designed to conduct the water from the first pipe (8) towards a selected hot beverage serving, and a third branch (21) is designed to conduct the water towards the first branch (19) of the next serving element (18). The third branch (21) of the last serving element (18) is closed in order to prevent water from leaking. All of the first branches (19) and third branches (21) of the serving elements (18) form part of a second pipe. Each serving element (18) comprises closing means (22), the selective opening and closing of which, regulated by the control card (33), produces the circulation of water through the second pipe towards the second branch (20) corresponding to the selected hot beverage serving.

The serving elements (18) are manufactured by extrusion of a polymer material resistant to the prevailing pressure and temperature conditions in the system. Preference is given to the material being polysulfone. The third branch (21) of a serving element (18) is joined to the first branch (19) of the next consecutive serving element (18) by means of a metal bushing (23) and secondary sealing joints (11).

The closing means (22) comprise a metal rod (24) sealingly disposed inside the serving elements (18) and designed to be electromagnetically excited by a metal core (25) stationarily mounted in proximity thereto. The controlled displacement of all of the rods (24) in conjunction, regulated by the control card (33), governs the circulation of water through the second pipe, as well as the outlet of water solely by the second branch (20) of the serving element (18) associated with the selected hot beverage. A second spring (12) enhances the displacement of the rod (24).

The invention claimed is:

1. A boiler and dispenser system for a hot beverage vending machine, comprising:
    a pressurized, closed boiler, which comprises a water intake;
    a dispenser, configured to allow a passage of water towards a selected hot beverage serving;
    a first pipe, interconnecting the boiler and the dispenser;
    a first three-way valve, which comprises a seat and a pilot joined to said seat, wherein the seat of the first three-way valve is integrated in the boiler, the said first three-way valve being disposed adjacently to the boiler and comprising:
        a first way connected to a water inlet from the boiler,
        a second way connected to an outside air inlet, and
        a third way connected to an outlet connected to the first pipe, for communicating the boiler with the dispenser through the first pipe;
    the first three-way valve being designed for selectively:
        allowing a circulation of water coming from the boiler towards the dispenser along the first pipe by the third way through the first way, or
        allowing a circulation of air coming from the outside towards the dispenser along the first pipe by the third way through the second way; and
    a control card configured to control opening of the first three-way valve and operation of the dispenser,
    for allowing drainage of the first pipe after dispensation of the selected hot beverage serving to purge water from the boiler and dispenser system downstream from the boiler towards the dispenser.

2. The boiler and dispenser system for a hot beverage vending machine according to claim 1,
    wherein the dispenser comprises a plurality of serving elements connected consecutively, each of which comprises first, second, and third branches,
    wherein, for each of the plurality of serving elements:
        the first branch is configured to allow an inlet of water from the first pipe or from the each serving element,
        the second branch is configured to conduct water towards the selected beverage serving, and
        the third branch is configured to allow an outlet of water towards the first branch of a next serving element, and
    wherein the soluble or infusion hot beverage dispenser further comprises a closer that allows a selective circulation of water through a second pipe only towards the second branch of the serving element associated with the selected hot beverage serving, the second pipe comprising the first branch and the third branch of each of the serving elements.

3. The boiler and dispenser system for a hot beverage vending machine according to claim 1, wherein the boiler is formed by two stamped bodies joined together.

4. The boiler and dispenser system for a hot beverage vending machine according to claim 3,
    wherein the first three-way valve further comprises a pilot and a water and air outlet via the third way of the first three-way valve,
    wherein the boiler further comprises a water intake and a connection to the pilot, and
    wherein the bodies of the boiler are essentially equal and interchangeable, so that one of the bodies mechanically bears the water intake for the boiler, whereas the other body mechanically bears, on a seat, the water and air outlet and the connection to the pilot.

5. The boiler and dispenser system for a hot beverage vending machine according to claim 2, wherein the third branch of each serving element is sealingly joined to the first branch of a next serving element by metal bushings.

6. The boiler and dispenser system for a hot beverage vending machine according to claim 1, wherein the boiler and the dispenser are connected in remote disposition by the first pipe.

\* \* \* \* \*